(12) United States Patent
Boire et al.

(10) Patent No.: US 7,194,829 B2
(45) Date of Patent: Mar. 27, 2007

(54) LABELER FOR PIPES, CONDUITS, TUBES, AND RODS

(75) Inventors: Martin C. Boire, Ormond Beach, FL (US); Janet L. Boire, Ormond Beach, FL (US)

(73) Assignee: The Volusia Holdings Corporation, Ormond Beach, FL (US)

( * ) Notice: Subject to any disclaimer, the term of this patent is extended or adjusted under 35 U.S.C. 154(b) by 0 days.

(21) Appl. No.: 11/245,808

(22) Filed: Oct. 5, 2005

(65) Prior Publication Data

US 2006/0048418 A1    Mar. 9, 2006

Related U.S. Application Data

(60) Division of application No. 09/894,044, filed on Jun. 28, 2001, now abandoned, which is a continuation-in-part of application No. 09/233,397, filed on Jan. 19, 1999, now abandoned.

(51) Int. Cl.
*G09F 3/00* (2006.01)

(52) U.S. Cl. .......................................... 40/316; 40/666

(58) Field of Classification Search .................. 40/316, 40/665, 666, 661; 285/93
See application file for complete search history.

(56) References Cited

U.S. PATENT DOCUMENTS

| 1,298,981 | A | * | 4/1919 | Loughridge | .................. | 40/316 |
| 1,540,320 | A | * | 6/1925 | Everett et al. | ................. | 40/666 |
| 2,675,594 | A |   | 4/1954 | Dryden | ........................ | 24/201 |
| 3,088,237 | A | * | 5/1963 | Plummer | ..................... | 40/316 |
| 3,322,381 | A |   | 5/1967 | Bubb | ........................ | 248/121 |

(Continued)

FOREIGN PATENT DOCUMENTS

DE    633468    7/1936    .................. 40/316

(Continued)

OTHER PUBLICATIONS

*Grainger General Catolog No. 380*, copyright 1991, p. 373, items 1A873 through 1A878.

*Primary Examiner*—William L. Miller
(74) *Attorney, Agent, or Firm*—Brian S. Steinberger; Law Offices of Brian S. Steinberger, P.A.

(57) ABSTRACT

A pipe or conduit labeler includes a saddle leg having an inside diameter equal to or slightly smaller than an outside diameter of a pipe or conduit to be labeled. The saddle leg is molded to a saddle stem which in turn is molded to a sign plate. A user either writes useful information directly on the sign plate or affixes a pre-made label to the plate. The sign plate optionally includes raised lettering or information such as an arrow pre-molded on the plate; or Braille characters. The labeler resiliently clips onto the pipe or conduit being labeled. More complex variations of the labeler include extending arms and moveble joins, enabling the identification of pipes or conduits which are at difficult angles or out of direct sight of a user. The labeler allows for quickly and clearly labeling pipes, conduit, tubes, and rods. The labeler can be mass produced as a single mold or in parts with different sign plates of varying size and construction. The sign plate provides a flat surface for writing. The labeler can be temporary, removable, or made permanent simply by applying an adhesive to the saddle portion prior to affixing the labeler.

4 Claims, 11 Drawing Sheets

U.S. PATENT DOCUMENTS

| | | | |
|---|---|---|---|
| 3,516,631 A | 6/1970 | Santucci | 248/71 |
| 3,550,299 A | 12/1970 | Salz | 40/156 |
| 3,977,104 A | 8/1976 | Stupar | 40/2 R |
| 4,246,712 A | 1/1981 | Vander Wall | 40/316 |
| 4,268,986 A * | 5/1981 | Piana | 40/316 |
| 4,295,412 A | 10/1981 | Hachiro | 91/468 |
| 4,649,658 A | 3/1987 | Sarton et al. | 40/316 |
| 4,656,767 A * | 4/1987 | Tarrant | 40/316 |
| 4,844,000 A | 7/1989 | Clement | 116/205 |
| 4,846,510 A | 7/1989 | Mikol | 285/226 |
| 4,899,474 A * | 2/1990 | Piana et al. | 40/316 |
| 4,951,596 A * | 8/1990 | Wallace, Jr. | 116/321 |
| 5,027,538 A | 7/1991 | Wilmes et al. | 40/316 |
| 5,111,605 A | 5/1992 | Bossi | 40/316 |
| 5,132,492 A | 7/1992 | Wieder | 174/65 R |
| 5,138,784 A * | 8/1992 | Niwa | 40/665 |
| 5,157,853 A | 10/1992 | Piana et al. | 40/316 |
| 5,170,578 A | 12/1992 | Pampel | 40/316 |
| 5,187,887 A * | 2/1993 | Mori et al. | 40/316 |
| 5,275,282 A * | 1/1994 | Ross et al. | 206/389 |
| 5,307,576 A | 5/1994 | Machen | 40/316 |
| 5,311,688 A | 5/1994 | Aeschbacher et al. | 40/665 |
| 5,315,774 A | 5/1994 | Champff | 40/316 |
| 5,335,889 A | 8/1994 | Hopkins et al. | 248/231 |
| 5,402,592 A | 4/1995 | Caveney et al. | 40/665 |
| 5,428,914 A | 7/1995 | Whitehouse et al. | 40/621 |
| 5,489,126 A * | 2/1996 | Gray, Jr. | 285/93 |
| 5,579,969 A | 12/1996 | Brandell | 224/277 |
| 5,606,813 A | 3/1997 | Cornu et al. | 40/316 |
| 5,623,890 A | 4/1997 | Lenske | 116/205 |
| 5,732,915 A | 3/1998 | Heard | 248/219.4 |
| 5,799,916 A | 9/1998 | Leachner | 248/230.8 |
| 6,651,362 B2 * | 11/2003 | Caveney | 40/316 |

FOREIGN PATENT DOCUMENTS

| | | | |
|---|---|---|---|
| GB | 1027818 | 4/1966 | 40/316 |

* cited by examiner

LABELER FOR PIPES, CONDUITS, TUBES, AND RODS

REFERENCE TO RELATED APPLICATIONS

This application is a divisional of patent application Ser. No. 09/894,044 filed on Jun. 28, 2001, now abandoned, which is a continuation-in-part of parent patent application Ser. No. 09/233,397, filed on Jan. 19, 1999, now abandoned, entitled "LABELER FOR PIPES, CONDUITS, TUBES, AND RODS". The aforementioned application is hereby incorporated herein by reference.

FIELD OF THE INVENTION

The invention pertains to the field of identification and marking of wiring, plumbing, and control rods. More particularly, the invention pertains to a device for identifying pipes, conduits, cables, tubes, and rods with information as suits a user.

BACKGROUND OF THE INVENTION

The increasing complexity of communication, data, plumbing, gaseous, and electrical systems in use today necessitates the organization and clear labeling of such systems. Examples include communication systems with cables and conduits, laboratory tubing, fire suppression systems supplying a multitude of zones, irrigation systems, swimming pool circulation systems especially those which self-control their chlorine and pH levels, and zoned hot water heating systems in residential and commercial buildings. Labeling of piping used to transfer hazardous liquids and gases is common in industrial buildings and research facilities.

Identification of flexible cords, grounded and ungrounded conductors, etc is required by the National Electric Code (NEC 110-21, 210-4(d), 215.8, 310-11, 333-22, 338-5, 340-6, 348-15(d), 363-17, 402-9, 504-80(b), 725-71(h), 727-5, 800-50, and 820-50), as well as by state and local laws. Complex wiring systems used in hospitals and health care facilities have specific identification requirements under the National Electric Code. In addition, NFPA and ANSI standards require marking of certain electrical wiring and plumbing such as pressure and vacuum piping, and piping used to transfer hazardous substances (NFPA 3-9, 2-7.7, 7.6.6, 7.7.6, 2-4.4, 2-4.3, and 4-6). Identification of valves used in fire suppression systems is required by NFPA as well (NFPA 4-2.8.1 through 4-2.8.3).

Labeling of piping and wiring which is not required by national standards makes maintenance work easier, facilitates usage of specialized piping, and saves time in tracing the source or destination of wiring and piping. Information can also include who to call for service, maximum rated pressures, gas line identification, the purpose of a valve, how a valve relates to another valve, direction and rate of flow, emergency shut-off instructions, etc. Levels of safety are increased by providing cautionary markers on hazardous piping or directly on valves, for example, extreme temperatures. Such marking is extremely useful in emergencies since reading information prominently displayed on the pipe or valve of concern and immediately acting on the information closely parallels human thought processes that occur in an unexpected situation. This is of obvious interest to insurance companies.

Labeling of cables and pipes in the past has included handwriting on the pipe surface, which is problematic in many ways. Writing on a round or curved surface is difficult, especially if the outside diameter is small, frequently producing a sloppy or illegible result. The total surface area available for labeling is limited and often not conveniently placed for easy reading. Repairs or replacement of the underlying pipe or conduit destroys any written information thereon. Painted markings, tied-on handling paper, plastic tags, or colored tape bands are subject to peeling and corrosion, easy removal, and require referring to a legend or master coding sheet.

Other pipe identification systems include wrapping straps attached to an information plate around piping, such as the pipe identification system disclosed in U.S. Pat. No. 4,246,712. This method is subject to many limitations. For example, the method does not allow for the labeling of surface mounted piping or conduit, as there is no space to wrap the straps. It does not allow for an adjustable multi-position labeling surface. It is not usable in installations where pliers are necessary to tighten adequately the straps. It is subject to loosening and rotation from mechanical, vehicular or natural vibration. It is also subject to lateral slippage along a vertical pipe or a horizontal pipe from such vibration, thus becoming improperly located with possible disastrous results. Also, this method makes it more difficult to change a label if so desired.

SUMMARY OF THE INVENTION

Briefly stated, a pipe or conduit labeler includes a saddle leg having an inside diameter equal to or slightly smaller than an outside diameter of a pipe or conduit to be labeled. The saddle leg is molded to a saddle stem which in turn is molded to a sign plate. A user either writes useful information directly on the sign plate or affixes a pre-made label to the plate. The sign plate optionally includes raised lettering or information such as an arrow pre-molded on the plate, or Braille characters. The labeler resiliently clips onto the pipe or conduit being labeled. More complex variations of the labeler include extending arms and moveable joints, enabling the identification of pipes or conduits which are at difficult angles or out of direct sight of a user. The labeler provides a means for quickly and clearly labeling pipes, conduit, tubes, and rods. The labeler can be mass produced as a single mold or in parts with different sign plates of varying size and construction. The sign plate provides a flat surface for writing. The labeler can be applied in a temporary, removable manner, or can be made permanent simply by applying an adhesive to the saddle portion prior to affixing the labeler to the pipe.

A user may place information on the sign plate by (a) hand writing it directly on the plate, (b) placing on the sign plate's surface a piece of paper containing the desired information, either hand written or typed, before covering it with an optional clear plastic cover, (c) sticking to the sign plate's surface a preprinted sticker of vinyl or other material produced for that job by the user, architect, or project engineer, or (d) by utilizing a pre-manufactured sign plate with raised molded information on it (such as an arrow and the words "flow direction").

The labeler is preferably a molded PVC part, like any other PVC fitting. PVC as used herein means PVC, CPVC, gray electrical PVC, and any other type of plastic or polymer out of which pipe and conduit are manufactured.

The present invention overcomes all the previously mentioned problems of labeling. It provides a flat surface for writing. It is not affected by vibration nor is it prone to rotation or lateral slippage. The labeler requires no tools to install. The sign surface can be rigid or fixed in position, or can be adjustable vis-a-vis the pipe being labeled. It can be attached to any piping or conduit, be it free standing or surface mounted. The labeler can be installed in a removable manner as in its basic clip-on use or in a permanent manner simply by applying an adhesive to the saddle portion prior to its application. The invention provides a means of identifying, informing, or cautioning persons about plumbing and electrical systems. It is useful for those workers originally installing these systems as well as for those who maintain them in the following months and years. It enables those operating or maintaining a system to readily identify which pipe goes where, what function each valve has, how the valve interrelates with another valve, and any other information deemed appropriate.

DESCRIPTION OF THE PREFERRED EMBODIMENT

For the purpose of this description and claims, "pipe" or "piping" means piping, conduit, tubing, or other generally cylindrically shaped hollow construction, whether rigid or flexible, for conveying a substance, wiring, or fiber optic from one point to another point, as well as solid rods and levers.

Figure 1A:
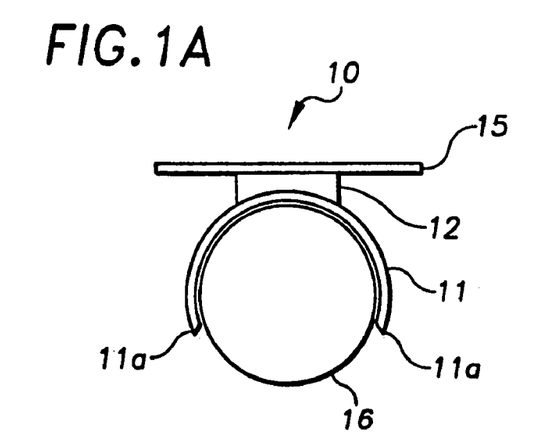
FIG. 1A shows an end view of a labeling device according to an embodiment of the present invention.
Figure 1B:
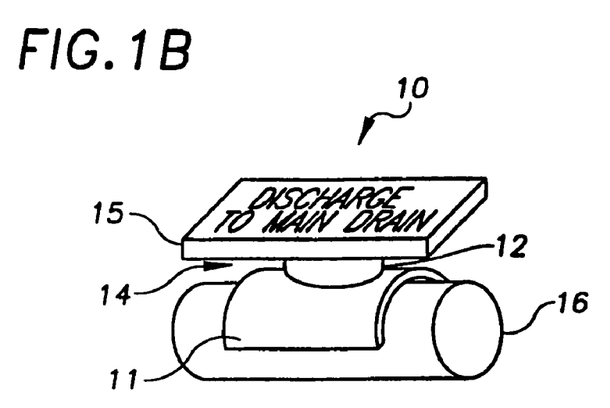
FIG. 1B shows a perspective view of the labeling device of the embodiment of FIG. 1A.

Referring to FIGS. 1A and 1B, a first embodiment of a labeler 10 includes a sign plate 15 permanently molded to a saddle stem 12 which in turn connects to a saddle fitting 11. The inside diameter of saddle fitting 11 is preferably shaped as a section of a circle having a gap of less than 180°, such that when applied to a pipe, tube, or conduit having an outside diameter and an axial length, the inside diameter of the saddle fitting 11 is equal to or slightly smaller than the outside diameter of the pipe, tube or conduit and the inside diameter of the saddle fitting is in contact with the outside diameter of said pipe, tube, or conduit. Sign plate 15 is preferably of a size to allow legible identification of a pipe 16, while being any shape or thickness. Marking of sign plate 15 can be as simple as writing directly on it with a magic marker, or by affixing a computer-produced label, or any other labeling method the user found suitable. For example, the engineers, designers and architects of complex systems can use a conjunctive add-on software program for CADD systems as they design a piping system, open and note window, and insert operational labels into the system construction plans where they deem them necessary. These labels can be printed directly onto stick-on vinyl sheets of labels, which can then be peeled off and affixed to sign plates 15 at the time of construction. The system can indicate what size and type of labeler 10 the designer desires at each location.

Saddle stem 12 is rounded or angular, and its height is preferably ¼ an outside diameter of pipe 16. For example, if pipe 16 is a cable which is 1" in diameter, saddle stem 12 is ¼" in height. Saddle stem 12 is larger or smaller than ¼ the outside diameter of pipe 16 depending on a user's desire. Saddle fitting 11 preferably has an inside diameter equal to or slightly smaller than the outside diameter of pipe 16. For example, when pipe 16 is a copper pipe of outside diameter ½", saddle fitting 11 has an inside diameter slightly smaller than ½" so that saddle fitting 11 resiliently fits around pipe 16. The resilient fitting of saddle fitting 11 around pipe 16 thus prevents accidental displacement of labeler 10. If the user desires to permanently mount saddle fitting 11 on pipe 16, a drop of adhesive is simply applied to the inside surface of saddle fitting 11 prior to securing it to pipe 16.

Saddle fitting 11 preferably extends slightly more than one-half of the way around pipe 16. In addition, two edges 11a of saddle fitting 11 are preferably beveled so that saddle fitting 11 easily expands while being placed onto pipe 16. Saddle fitting 11 can extend in an axial direction of pipe 16 either flush with saddle stem 12 or further if desired. In some situations, it might be desirable for saddle fitting 11 to be banded to pipe 16 on either side of saddle stem 12 with tightening bands or clamps for additional strength. It is also possible that labeler 10 can be used to repair a leak by adhering saddle stem 12 to pipe 16 directly over the leak with the appropriate notation made on sign plate 15. In this circumstance, saddle fitting 11 would extend along both sides of saddle stem 12 to ensure an adequate surface for the pipe cement.

Labeler 10 is preferably constructed of plastic PVC, although some metals have flexibility necessary for the tight fit over pipe 16. PVC as used herein means PVC, CPVC, gray electrical PVC, bright blue plastic as used for flexible conduit, and any other type of plastic or polymer or resin out of which pipe and conduit are manufactured. Brass, copper, and aluminum are examples of metals which work as long as saddle fitting 11 is not too thick, i.e., so thick that saddle fitting 11 no longer has the required resiliency to fit over pipe 16. Plastic is less expensive in the manufacturing process, easy to write on, and is resistant to many chemical environments. Metal would be a more common choice if outgassing of the material is of concern, as in a vacuum environment. In addition, metal would be a more logical choice if the labeler 10 is used in an area exposed to UV radiation. In some very specialized applications, labeler 10 can be made of any glass type, including fiberglass. Labeler 10, in its first embodiment and associated variations, is preferably of unibody (one-piece) construction, while integral construction is optional. Labeler 10 can be made in any color necessary or desirable, such as when color codes which are known and used in particular applications are made part of the identification scheme using labeler 10. In some specialized military applications, sign plate 15 can be molded with saddle fitting 11 as one extra-compact unibody without a distinct saddle stem in between.

Although not depicted herein, labeler 10 can also be used over rods and levers. For example, control rods or actuator rods can be distinctively marked using labeler 10.

Figure 2:
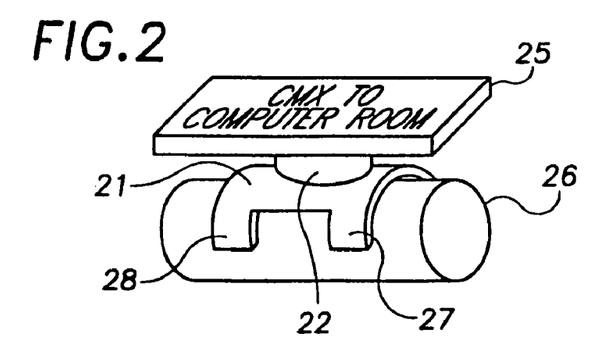
FIG. 2 shows a perspective view of a variation of the labeling device of FIG. 1A.

Referring to FIG. 2, a variation of the first embodiment is shown in which a saddle stem 22 connects a sign plate 25 to a saddle fitting 21. Saddle fitting 21 includes two saddle legs, 27, 28 which are preferably an extension of the same material as saddle fitting 21. As with saddle fitting 11, an inside diameter of saddle fitting 21 and saddle legs 27, 28 is equal to or slightly smaller than the than the outside diameters of a pipe 24. This embodiment is useful for large diameter pipe since it allows for more flexibility in saddle legs 27, 28 than in saddle fitting 11. Flexibility in the fitting of saddle legs 27, 28 becomes more necessary as the size of pipe or conduit 24 increases. This embodiment also reduces the amount of material used in mass production of the invention. However, on smaller conduit or piping, the use of unibody construction as shown in FIG. 1 is desirable when flexibility is not an issue as it is more sturdy.

Figure 3A:
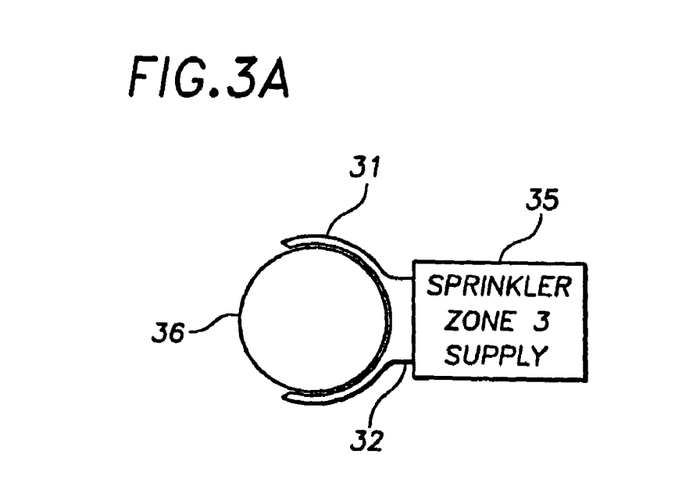
FIG. 3A shows an end view of a variation of the labeling device according to the present invention.
Figure 3B:
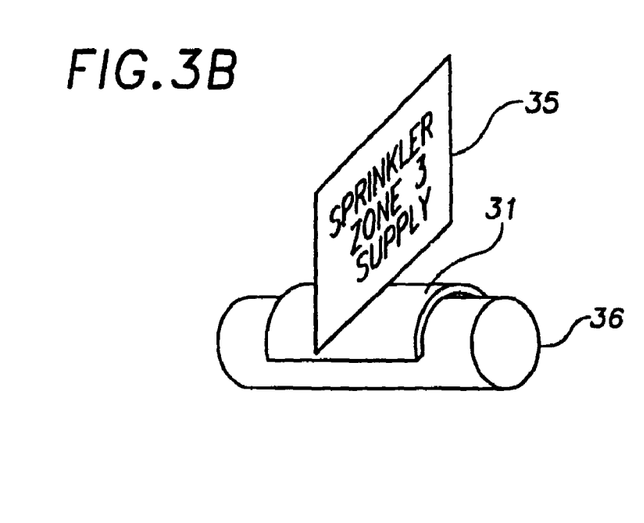
FIG. 3B shows a perspective view of a variation of the labeling device of FIG. 3A.
Figure 3C:
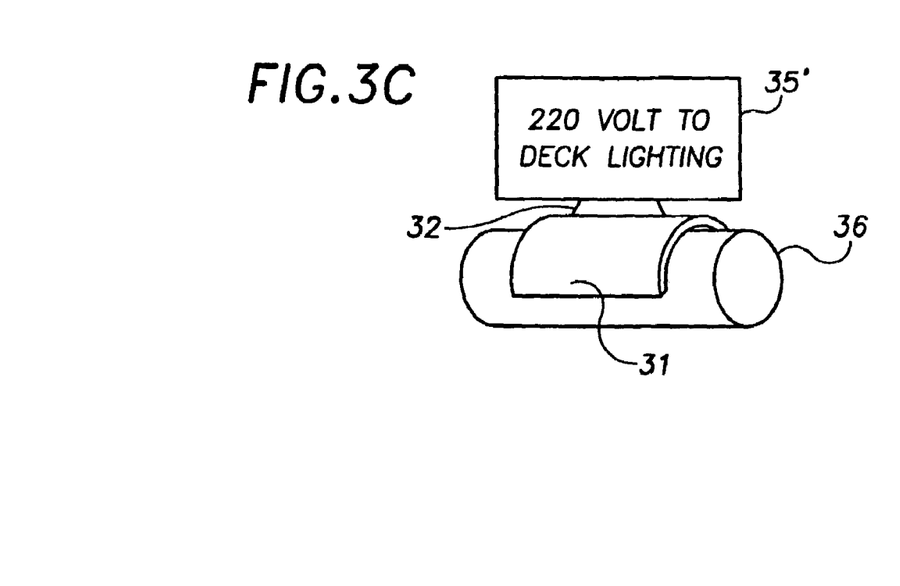
FIG. 3C shows a perspective view of a variation of the labeling device according to the present invention.

Referring to FIGS. 3A–3C, another variation of the first embodiment includes a saddle fitting 31 permanently molded to a saddle stem 32. A sign plate 35 is permanently molded to saddle stem 32 so that a writing surface of sign plate 35 is perpendicular to an axial length of a pipe 36 as shown in FIGS. 3A and 3B. This is of use when a usual view of pipe 36 is along its lengthwise axis. Sign plate 35 is of a size appropriate for the user's need. FIG. 3C shows a sign plate 35' permanently molded to a saddle stem 32 so that the plane of sign plate 35' is parallel to the axial length of pipe 36. This orientation is useful when the usual view of pipe 36 is head-on, i.e., perpendicular to the axis of pipe 36.

Figure 4A:
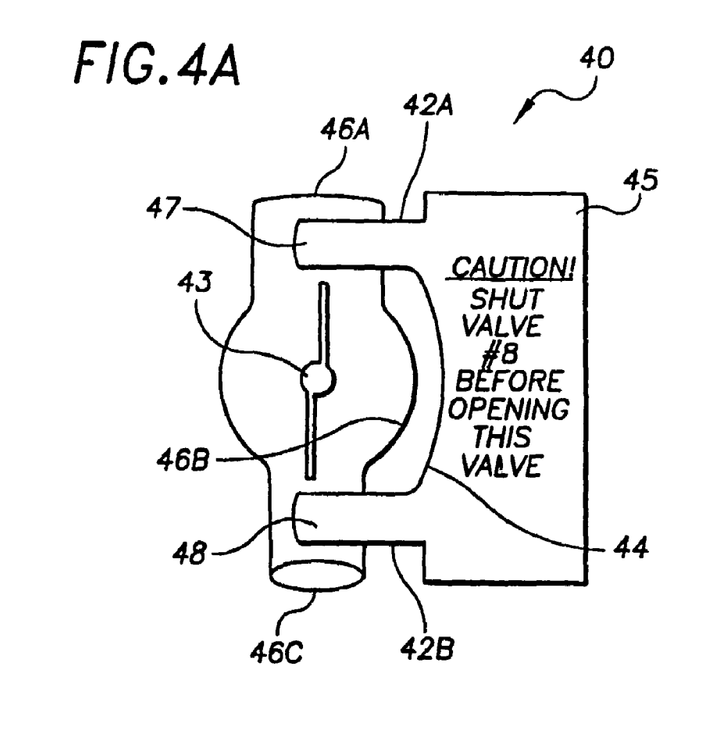
FIG. 4A shows a top view of a labeling device according to an embodiment of the present invention.

Referring to FIG. 4A, another variation of the first embodiment is shown in which a labeler 40 includes a sign plate 45 connected to two saddle legs 47, 48 via saddle stems 42A, 42B respectively. In this variation, saddle legs 47, 48 act as the saddle fittings shown in the previous variations of this embodiment. Saddle legs 47, 48 preferably have an inside diameter equal to or slightly smaller than an outside diameter of the pipes to which they are attached, which may be of uniform diameter or may be of differing sizes such as shown here with a pipe portion 46A and a pipe portion 46C. Valve 43 typically includes a curved pipe portion 46B between pipe portions 46A and 46C. Sign plate 45 includes a curved portion 44 so that the handle of valve 43 can be turned without hindrance. Labeler 40 is positioned so that it does not interfere with the operation of valve 43. In some circumstances, sign plate 45 optionally meets saddle stems 42A, 42B at a different angle (not shown) for better ease of use or better visibility. Sign plate 45 could be marked with information such as, for example, which sprinkler zone valve 43 controls. Such labeling is quite useful when repairing fire suppression systems, so that the entire system does not have to be shut down for maintenance work. In other variations, the sign plate can be molded to the saddle legs so that the saddle legs clip onto the pipe from the side, or the sign plate can be molded to the saddle legs so that the saddle legs clip onto the pipe from the front when there is little or no room at the side. The sign plate can be located on one or both sides of the valve assembly.

Figure 4B:
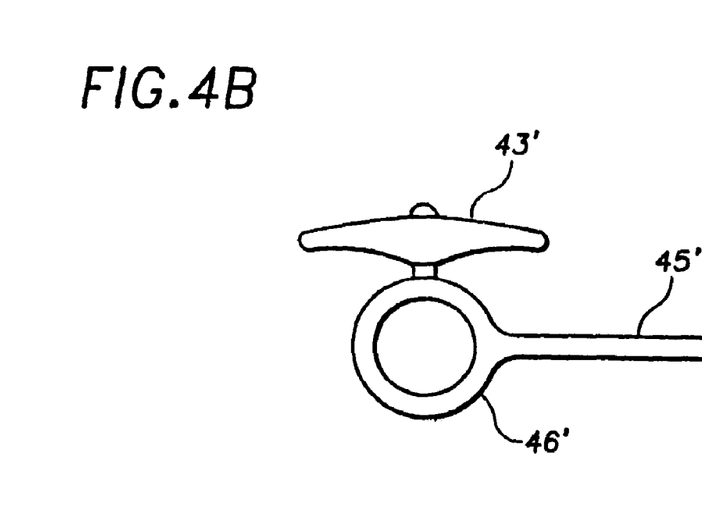
FIG. 4B shows an end view of a labeler according to the present invention premolded with a valve.

Referring to FIG. 4B, a sign plate 45' is pre-molded to valve assembly 46'. Sign plate 45' is located so that it does not interfere with turning valve handle 43'. Valve assembly 46' can be of any size or variation of valves commercially available, including shut-off valves, back-flow valves, ball valves, gate valves, and so forth. In this embodiment, sign plate 45' can be easily removed from valve assembly 46' if necessary. The sign plate can be located on one or both sides of the valve assembly.

Figure 5A:
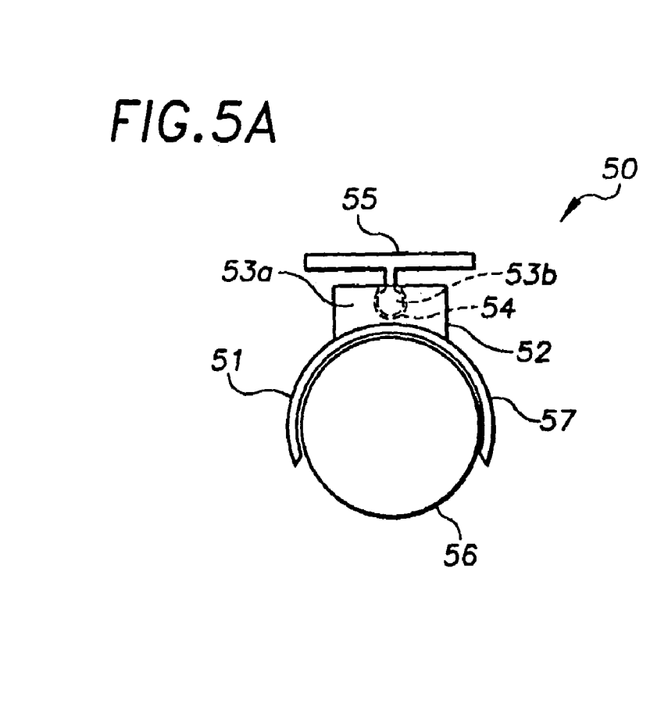
FIG. 5A shows a cross-sectional view of a labeling device according to an embodiment of the present invention in which a sign plate connects to a saddle stem via a ball and socket joint.

Referring to FIG. 5A, a second embodiment is shown in which a sign plate 55 of a labeler 50 is slightly adjustable. Sign plate 55 connects to a saddle stem 52 via a movable joint 54. A socket portion 53a of joint 54 optionally includes a plurality of slots (not shown) therein to permit easy connection with a ball portion 53b of joint 54. As with the previously described embodiments, saddle fitting 51 has an inside diameter equal to or slightly smaller than an outside diameter of a pipe 56. Saddle fitting 51 optionally includes one or more saddle legs 57. Joint 54 permits rotation adjustments and slight angling adjustments to be made to sign plate 55.

Figure 5B:
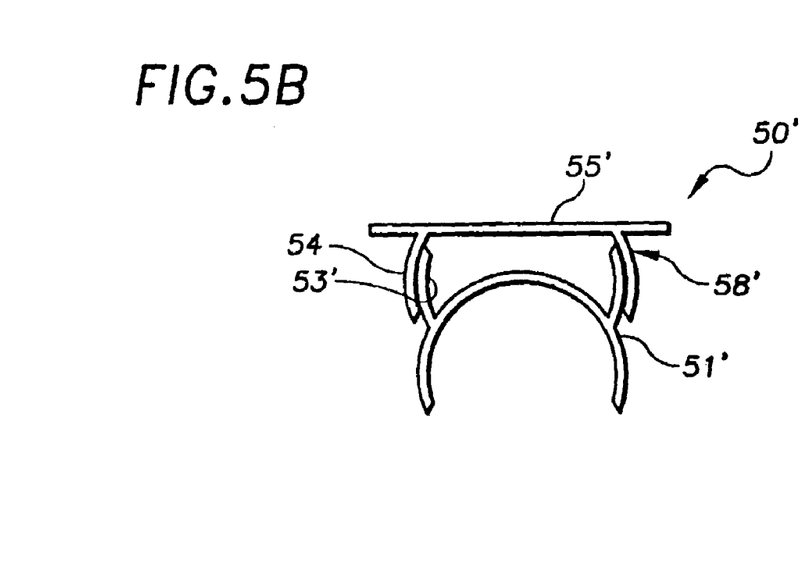
FIG. 5B shows a cross-sectional view of a labeling device according to an embodiment of the present invention in which a sign plate connects to a saddle stem via a ball and knuckle joint.

Referring to FIG. 5B, a variation of the second embodiment is shown wherein a sign plate 55' of a labeler 50' is connected to a saddle fitting 51' by a ball & knuckle joint 58' which consists of a knuckle 54' which fits over a ball 53'. Joint 58' permits rotation and slight angling adjustments to be made to sign plate 55'. Knuckle 54' optionally includes a plurality of slits or slots (not shown) that extend downward from sign plate 55' the length of the joint and provide increased flexibility for joint knuckle 54' to slip over ball 53'. Other types of movable joints can be used instead of the two described herein.

Figure 6:
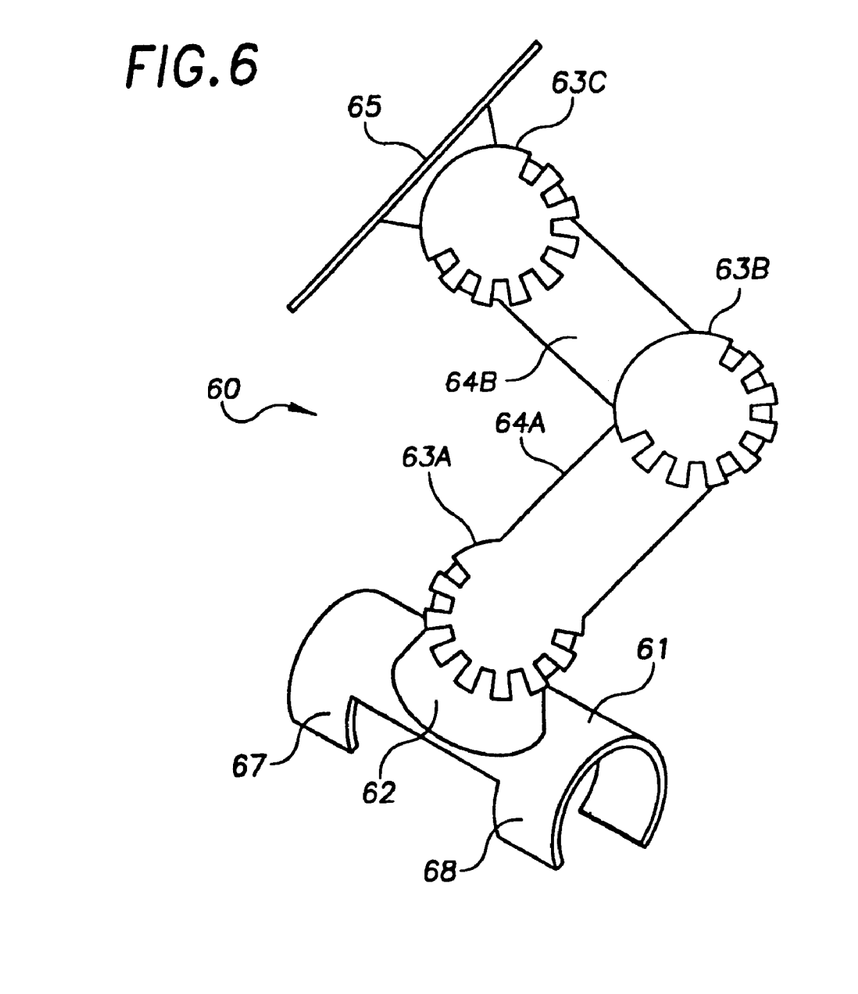
FIG. 6 shows a perspective view of a labeling device according to an embodiment of the present invention.

Referring to FIG. 6, a third embodiment of the invention is shown which is adjustable. A labeler 60 includes a saddle fitting 61 permanently molded to a saddle stem 62. Saddle fitting 61 optionally includes saddle legs 67, 68, and an inside diameter of saddle fitting 61 and saddle legs 67, 68 is equal to or slightly smaller than a pipe (not shown). A first movable joint 63A connects a first extension arm 64A to saddle stem 62. A second movable joint 63B optionally connects a second extension arm 64B to first extension arm 64A. A third movable joint 63C optionally connects a sign plate 65 to second extension arm 64B. The basic configuration is sign plate 65 connected to first extension arm 64A, either with or without movable joint 63B. Other variations of extension arms and movable joints are possible. The movable joints shown in the figure are ball and knuckle joints, but any movable joint can be used.

This embodiment allows for maximum flexibility in positioning sign plate 65. This is of use in situations where space is tight or views are obscured. Extension arms 64A, 64B can vary in size, length, and diameter. If the pipe is sufficiently large, extension arms 64A, 64B can themselves be lengths of off-the-shelf PVC piping. Extension arms 64A, 64B are preferably of plastic or metal with sufficient strength and rigidity so as not to sag or droop over time. Moveable joints 63A, 63B should be stiff enough to prevent unwanted movement of sign plate 65.

Figure 7A:
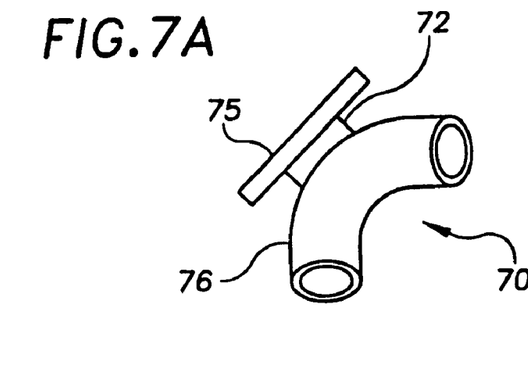
FIG. 7A shows a perspective view of a labeling device according to an embodiment of the present invention.
Figure 7B:
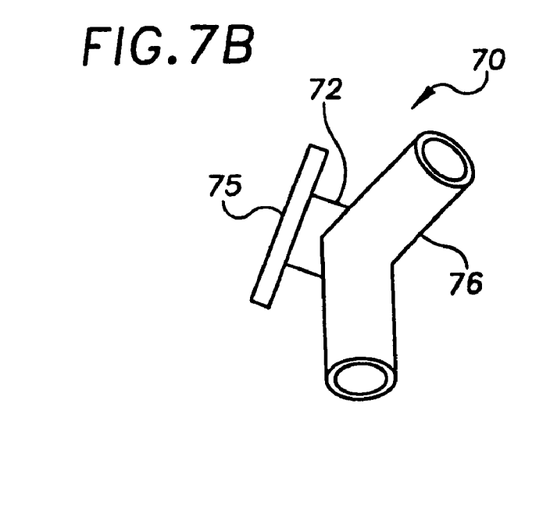
FIG. 7B shows a perspective view of a variation of the embodiment of FIG. 7A.

Referring to FIGS. 7A and 7B, a variation of the unibody first embodiment of the present invention is shown. A labeler 70 combines the present invention with an underlying pipe fitting 76. A sign plate 75 is permanently molded to a fitting stem 72 which in turn is permanently molded to pipe fitting 76. Pipe fitting 76 can be of any size or variation of angle typically sold in plumbing supply stores. As examples, a 90° elbow fitting is shown in FIG. 7A, and a 45° fitting is shown in FIG. 7B. Labeler 70 is intended to be manufactured and sold as a one-piece (unibody) or optionally integral unit.

Figure 8:
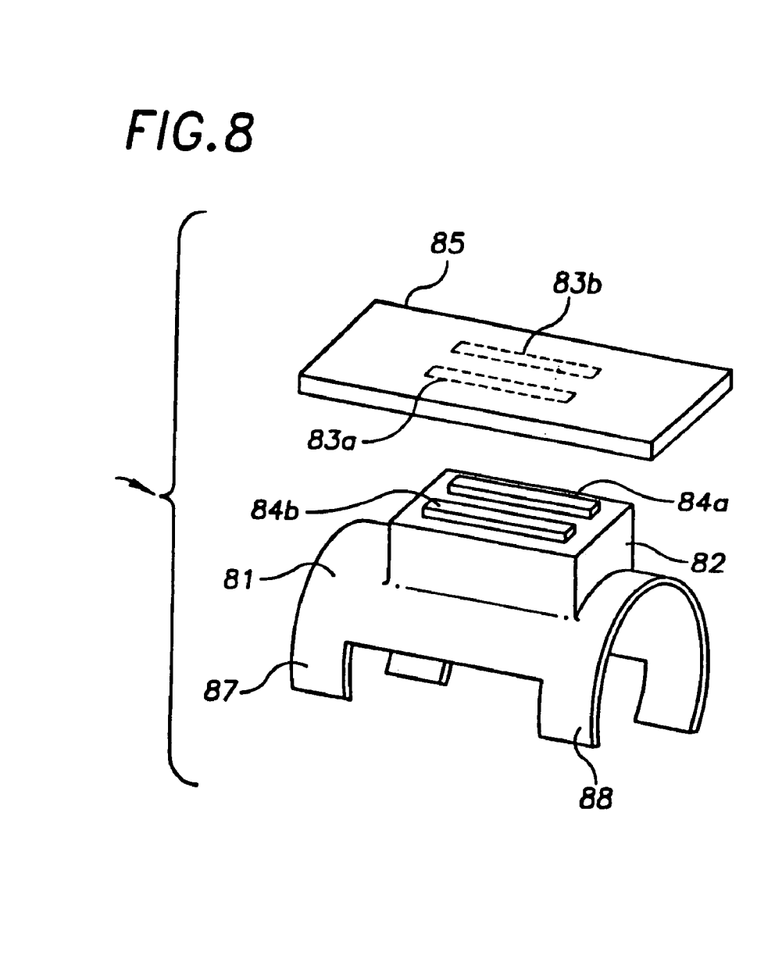
FIG. 8 shows a perspective view of a labeling device according to an embodiment of the present invention.

Referring to FIGS. 8A–8B, a fourth embodiment of the present invention includes a labeler 80 with a removable sign plate 85. As with the previously explained embodiments, a saddle stem 82 connects to a saddle fitting 81. Optional saddle legs 87, 88 extend from saddle fitting 81. An inside diameter of saddle fitting 81 and saddle legs 87, 88 is equal to or slightly less than an outside diameter of a pipe (not shown) over which labeler 80 is placed. Sign plate 85 is depicted with at least two grooves 83a, 83b on an underside thereof. Grooves 83a, 83b can extend entirely through sign plate 85, but preferably do not extend through sign plate 85, thereby leaving the surface (not shown) of sign plate 85 unblemished. Grooves 83a, 83b connect with similarly sized ridges 84a, 84b on saddle stem 82. A size and location of grooves 83a, 83b and ridges 84a, 84b are such as to promote stability of sign plate 85 when attached to saddle stem 82. A combination of pins and corresponding holes can optionally be used instead of a combination of grooves and ridges. Grooves 83a, 83b can optionally be in saddle stem 82 with corresponding ridges 84a, 84b on sign plate 85. This embodiment with removable sign plate 85 can be combined with the other embodiments and variations discussed above.

Figure 9A:
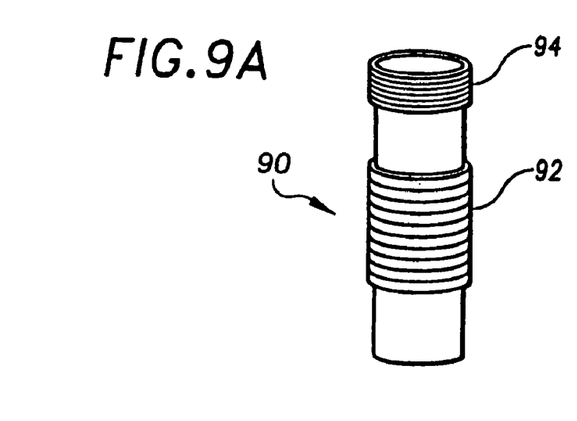
FIG. 9A shows a flexible connector used in conjunction with some of the embodiments of the present invention.
Figure 9B:
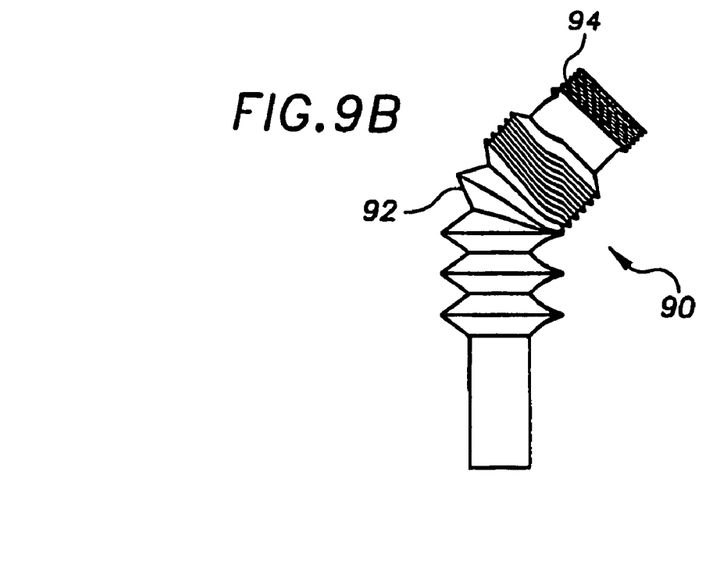
FIG. 9B shows the flexible connector of FIG. 9A in an extended and bent condition.

Referring to FIGS. 9A–9B, a connector 90 can be used to connect the sign plate to the saddle stem. A bellows section 92 permits expansion and bending as shown in FIG. 9B. Connector 90 connects to the sign plate (not shown) and the saddle stem (not shown) in any of the ways previously described, including movable joints and plug-in sockets. An alternate method of connection is via a threaded section 94 which screws into a corresponding threaded section recessed in the saddle stem or sign plate.

Figure 10A:
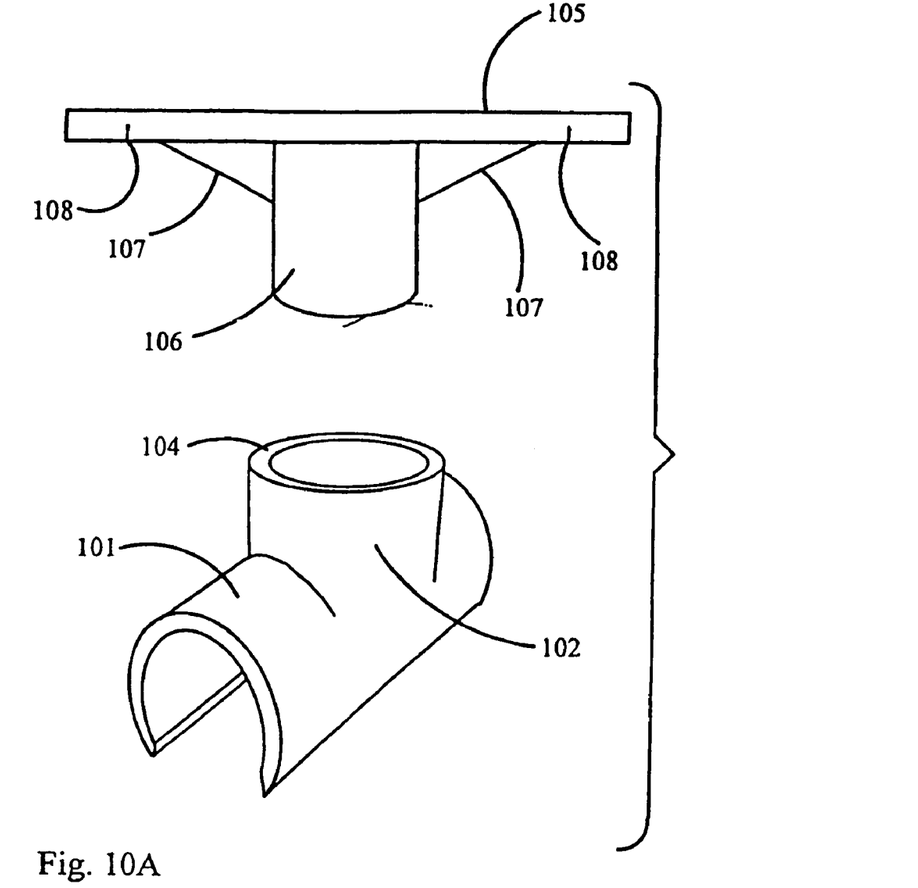
FIG. 10A shows a saddle "T" fitting used as part of an embodiment of a labeler according to the present invention.

Referring to FIG. 10A, a saddle "T" fitting is optionally used as part of the labeler of the present invention. A saddle stem 102 is molded with a saddle fitting 101. A sign plate 105 can be affixed directly to a stem top 104 (not shown) or a pipe portion 106, in which case pipe portion 106 fits into saddle stem 102. A plurality of optional struts 107 are pre-molded as part of sign plate 105 for extra support. Sign plate 105 is shown with a plurality of optional serrations 108 which permit the user to snap off portions of sign plate 105 until it is the desired size.

Figure 10B:
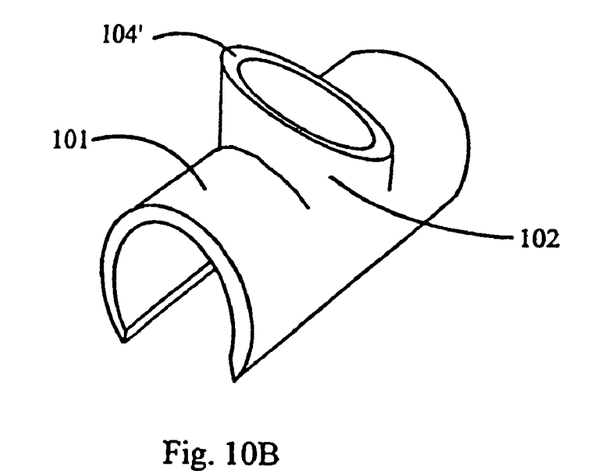
FIG. 10B shows a saddle "T" fitting with an angled top according to an embodiment of the present invention.

Referring to FIG. 10B, stem top 104' can be angled instead of horizontal. The angle can be in any direction as necessary for sign plate 105 to be easily seen. Alternatively, a length of PVC piping (not shown) or the connector 90 of FIGS. 9A and 9B can be inserted into stem top 104 with sign plate 105 affixed to the end of connector 90 as previously described.

Figure 10C:
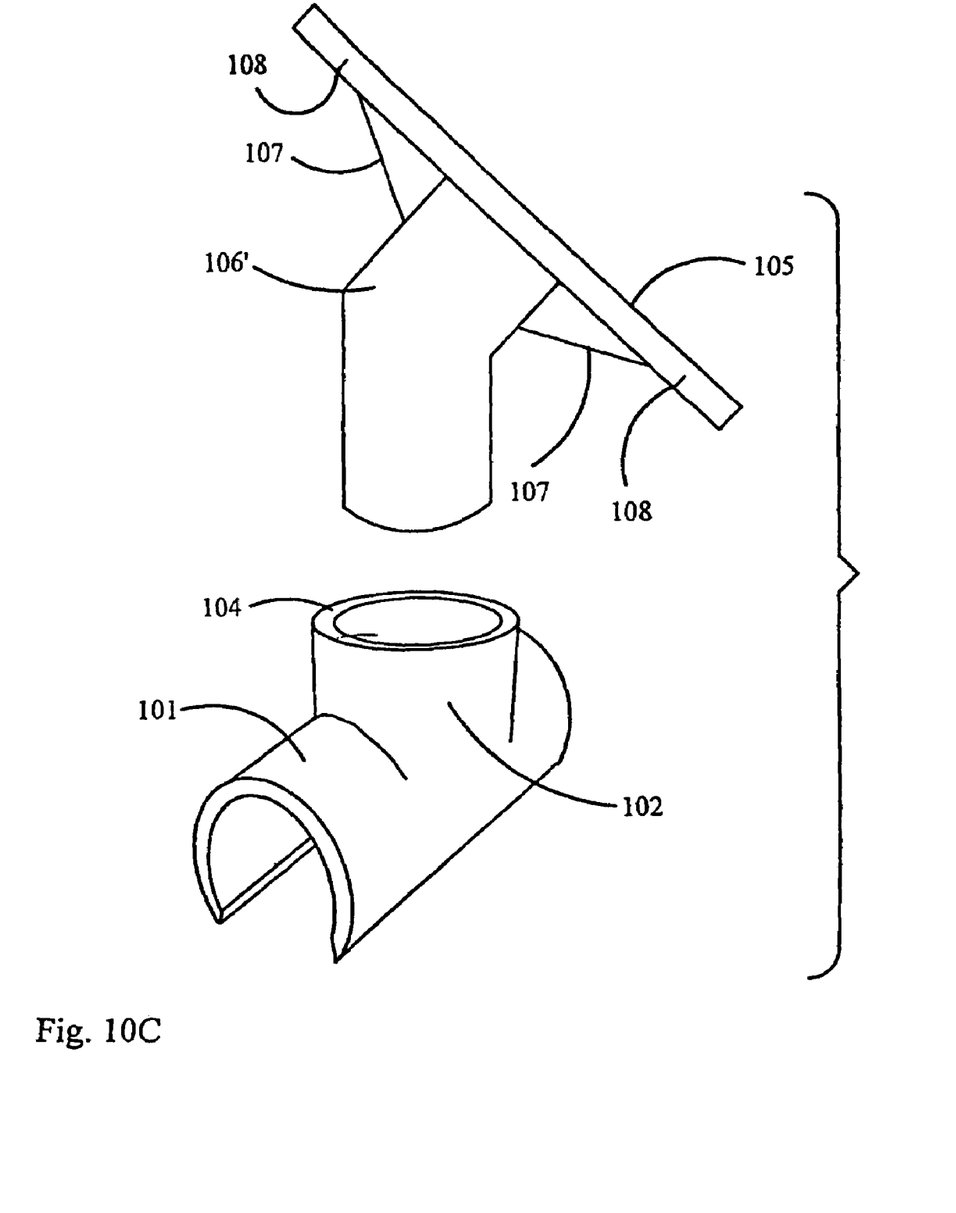
FIG. 10C shows a sign plate with an angled pipe portion that fits into a saddle "T" fitting according to an embodiment of the present invention.

Referring to FIG. 10C, a section of pipe portion 106' of sign plate 105 can be angled so that sign plate 105 can be rotated for the best view. As with the other embodiments, pipe portion 106' can be held in place within stem 102 by friction or permanently affixed using an adhesive.

Figure 11:
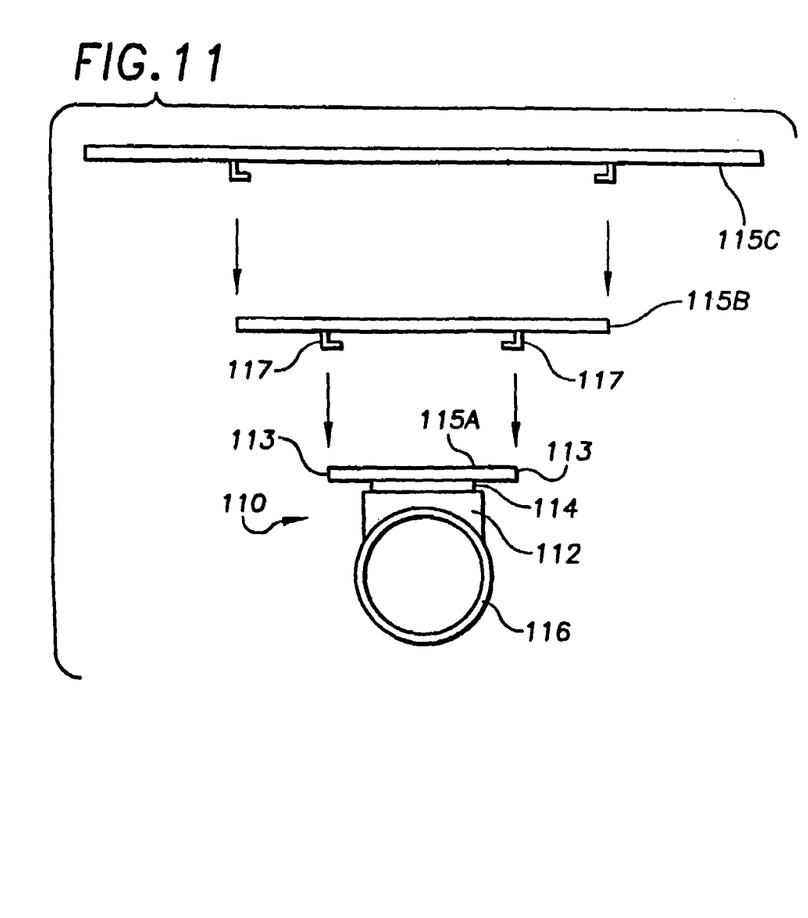
FIG. 11 shows an embodiment of the present invention with a removable sign plate and additional sign plates that attach to the first sign plate.

Referring to FIG. 11, another embodiment of a labeler 110 is shown. A stem 112 is premolded to a section of pipe 116. Stem 112 includes holes (not shown) that correspond to a plurality of pins 114 molded to an underside of a sign plate 115A. The number and placement of pins 114 is such as will promote strength and stability of sign plate 115A. When sign plate 115A proves too small for its intended purpose, an additional sign plate 115B slips-over sign plate 115A such that two J-rails 117 on sign plate 115B interlock with two edges 113 of sign plate 115A. Edges 113 can be made with serrations or ridges to increase the interlock and prevent accidental slippage. This method of increasing the usable surface or the sign plate can be continued, as is shown, for example, by a sign plate 115C that is sized to fit over sign plate 115B.

Figure 12A:
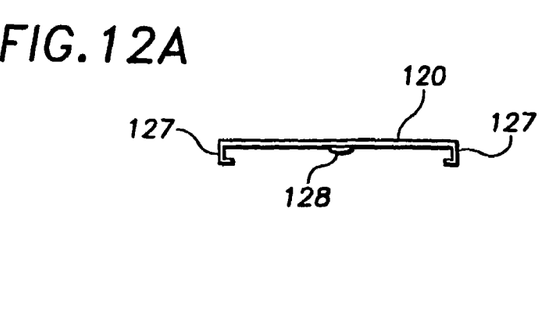
FIG. 12A shows an end view of a clear plastic cover that fits over the sign plate of the present invention.
Figure 12B:
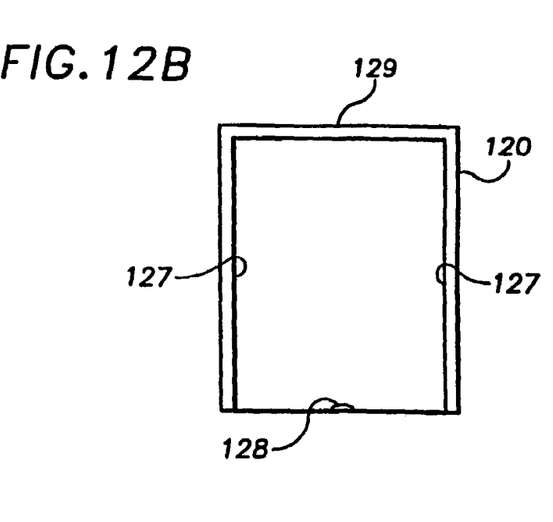
FIG. 12B shows a bottom view of the clear plastic cover of FIG. 12A.

Referring to FIGS. 12A–12B, a clear plastic cover 120 is shown that fits over the sign plate (not shown) of the present invention. Using cover 120 prevents accidental erasing or smudging of lettering on the sign plate that is written in a less than permanent medium, such as grease pencil or non-permanent marking pen. For outdoor use, cover 120 optionally contains UVA protectants to prevent the written information from being bleached by sunlight. Cover 120 includes two parallel J-rails 127 that slide over the edges of the sign plate. A third J-rail 129 provides an additional edge of contact between cover 120 and the sign plate. An optional locktab 128 at a front end of cover 120 prevents cover 120 from slipping off the sign plate once installed. Alternatively, locktab 128 and J-rail 129 are omitted and the edges of the sign plate are serrated or micro-notched as described with respect to the embodiment of FIG. 11 above.

Figure 13:
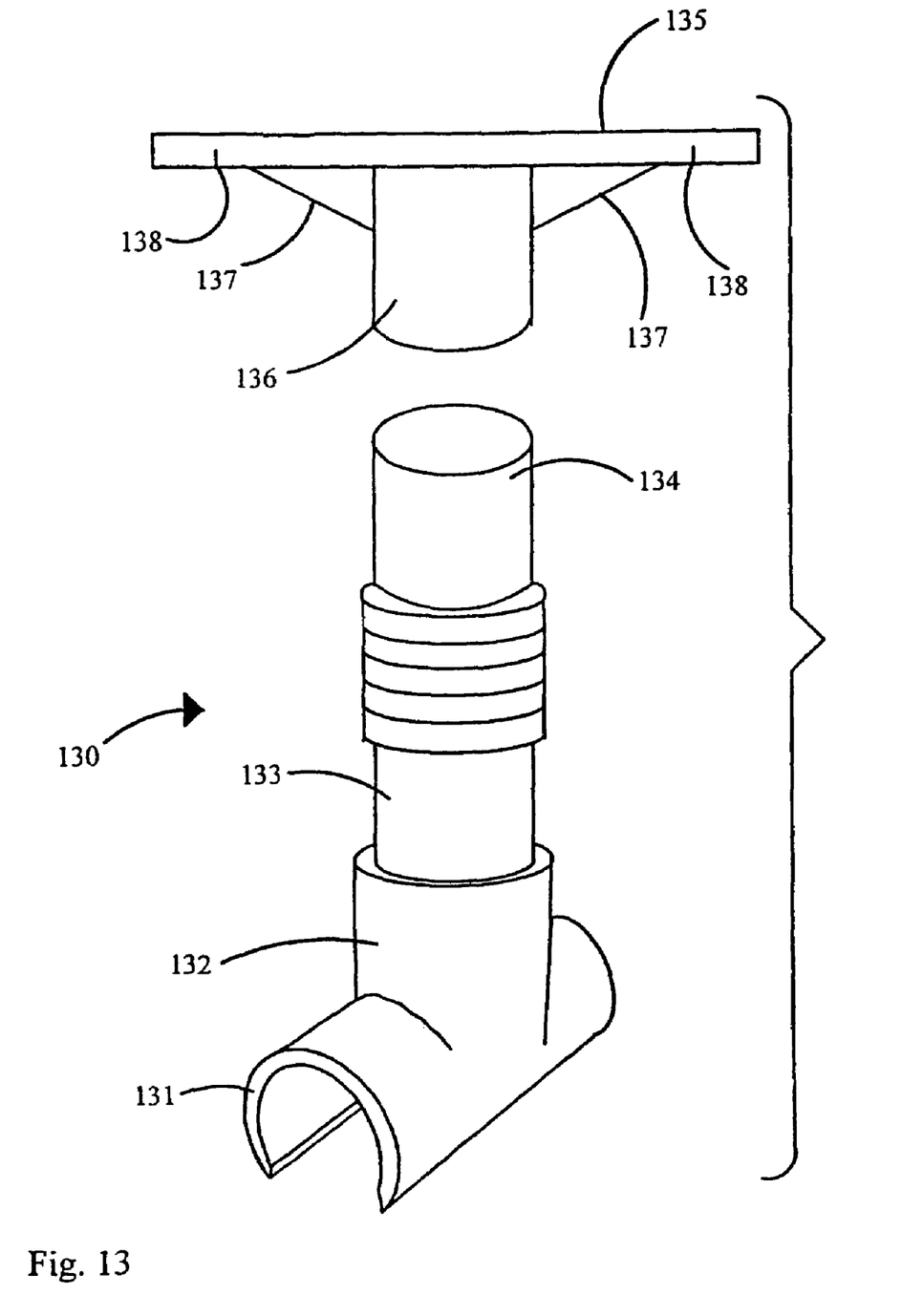
FIG. 13 shows a perspective view of an embodiment of a labeler according to the present invention.

Referring to FIG. 13, a labeler 130 includes a saddle fitting 131 pre-molded with a hollow saddle stem 132 as is found in conventional saddle "T" PVC fittings. An expandable/adjustable (flexible) connector 133 such as shown in FIGS. 9A–9B, but without the threads, fits into saddle stem 132. A plurality of struts 137 are pre-molded as part of sign plate 135 for extra support. Sign plate 135 is shown with a plurality of serrations 138 which permit the user to snap off portions of sign plate 135 until it is the desired size.

Figure 14:
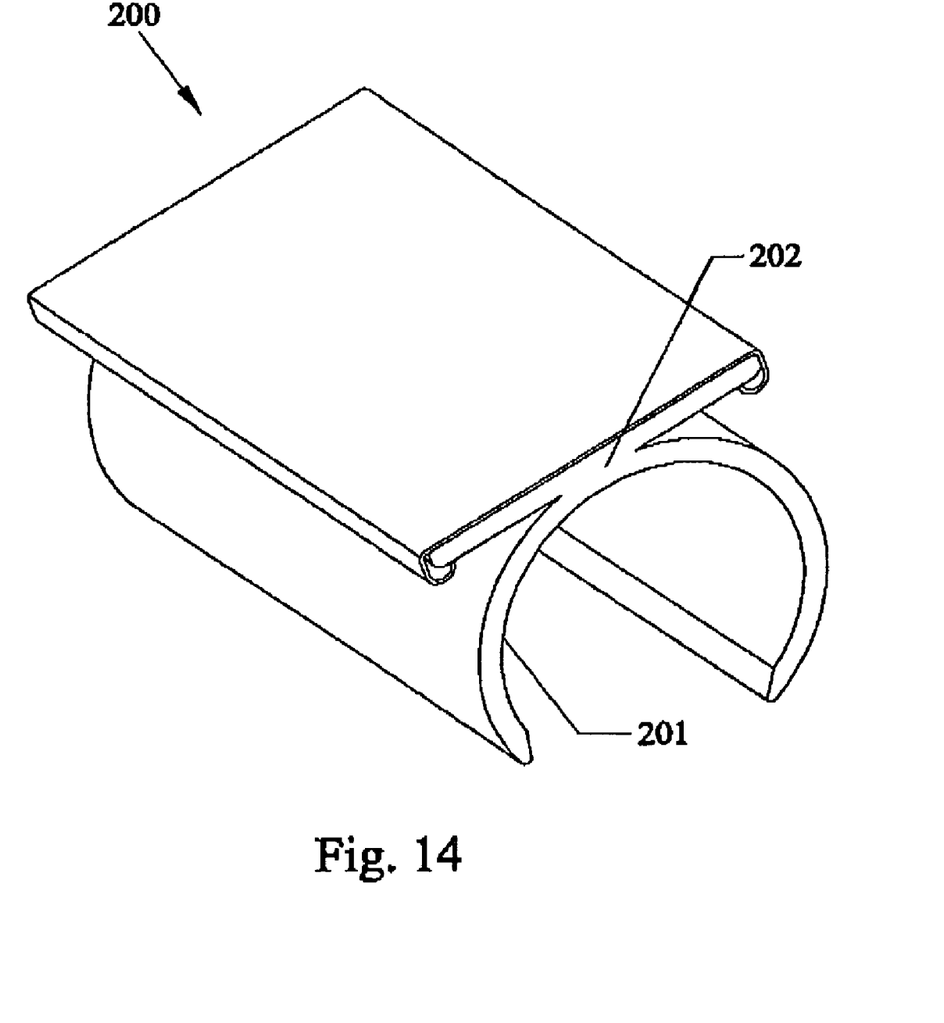
FIG. 14 shows the sign plate molded with the saddle fitting as a single compact body in a preferred embodiment of the invention.

Referring to FIG. 14, the pipe labeler 200 is fabricated as a single piece. The saddle fitting 201 is molded to the sign plate 202 as one extra-compact unibody without a distinct saddle stem in between. This design is especially useful on naval ships to give a low profile method of labeling pipes on the walls. This design also has uses in factories. The sign plate 202 is preferably of various widths to accomodate industry standard industrial labels. In a preferred embodiment, a clear plastic cover (not shown) can be snapped over the sign plate 202.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A labeler for pipes, conduits, tubes and rods comprising a sign plate for applying a label to the labeler;
   a saddle fitting integrally formed with the sign plate for attaching the labeler over a section of the pipes, conduits, tubes or rods, the saddle fitting having an inner surface shaped as a section of a circle ending with beveled edges to allow the saddle fitting to expand while being placed onto the pipes, conduits, tubes or rods, the section of a circle having an inside diameter equal to or slightly smaller than an outside diameter of said pipes, conduits, tubes or rods; and
   a cover shaped to fit over the sign plate for protecting the label applied to the sign plate, the cover including curved side rails to allow the cover to slide over the sign plate.

2. The labeler of claim 1, wherein the beveled edges include:
   a flat side portion within the section of the circle.

3. A labeler for pipes, conduits, tubes and rods comprising:
   a sign plate having an external surface for applying a label;
   a saddle fitting integrally formed with the sign plate, the saddle fitting having a shape corresponding to the pipes, conduits, tubes or rods over which the saddle fitting is attached and a gap ending with beveled edges to allow the saddle fitting to expand when placed over a section of the pipes, conduits, tubes or rods, wherein an inside diameter of the saddle fitting is equal to or slightly smaller than an outside diameter of said pipes, conduits, tubes or rods; and
   a cover shaped to fit over the sign plate for protecting the label applied to the sign plate, the cover including curved side rails to allow the cover to slide over the sign plate.

4. A method of labeling a circular pipe, tube, conduit or rod comprising the steps of:
   providing a labeler having a saddle fitting and a sign place fabricated as a unibody, wherein an inside diameter of the saddle fitting corresponds to a shape of the circular pipe, tube, conduit or rod and having a gap ending with beveled edges;
   providing a cover shaped to fit over the sign plate for protecting the label applied to the sign plate, the cover including curved side rails to allow the cover to slide over the sign plate; and
   applying the labeler with beveled edges to the circular pipe, conduit, tube or rod, wherein the beveled edges of the saddle fitting allows the saddle fitting to expand for attaching the labeler over a section of the pipe, conduit, tube or rod.

* * * * *